(12) United States Patent
Porter et al.

(10) Patent No.: US 12,704,625 B2
(45) Date of Patent: Aug. 11, 2026

(54) TERRAIN FOLLOWING RADAR WITH SMART SCAN

(71) Applicant: RAYTHEON COMPANY, Waltham, MA (US)

(72) Inventors: Stephen Reed Porter, Fairview, TX (US); Vaishal Shah, Plano, TX (US); Todd Lovell, Allen, TX (US)

(73) Assignee: Raytheon Company, Arlington, VA (US)

( * ) Notice: Subject to any disclaimer, the term of this patent is extended or adjusted under 35 U.S.C. 154(b) by 903 days.

(21) Appl. No.: 17/950,717

(22) Filed: Sep. 22, 2022

(65) Prior Publication Data

US 2025/0389845 A1 Dec. 25, 2025

(51) Int. Cl.
*G01S 13/935* (2020.01)
*G01S 13/42* (2006.01)

(52) U.S. Cl.
CPC .......... *G01S 13/935* (2020.01); *G01S 13/428* (2013.01)

(58) Field of Classification Search
CPC ............................ G01S 13/935; G01S 13/428
See application file for complete search history.

(56) References Cited

U.S. PATENT DOCUMENTS

| | | | | |
|---|---|---|---|---|
| 7,880,668 | B1 * | 2/2011 | Krause | G01S 7/40 342/75 |
| 8,755,954 | B1 * | 6/2014 | McCusker | G01S 13/426 701/4 |
| 9,110,170 | B1 * | 8/2015 | Woollard | G01S 13/89 |
| 9,739,570 | B1 * | 8/2017 | Beard | G01S 13/72 |
| 2021/0407303 | A1 * | 12/2021 | Yogesha | G06V 20/17 |

* cited by examiner

*Primary Examiner* — William Kelleher
*Assistant Examiner* — Isabella Ameyali Edrada

(57) ABSTRACT

A Terrain Following/Terrain Avoidance (TF/TA) radar that receives terrain information and known obstacle information from a plurality of databases; receives radar data from the TF/TA radar; fuses the terrain information and known obstacle information with the radar data; adds unknown obstacle information to the fused data to generate scanning schedule information; and utilizes the scanning schedule information to schedule a next radar scan by the TF/TA radar.

20 Claims, 4 Drawing Sheets

TERRAIN FOLLOWING RADAR WITH SMART SCAN

FIELD

The present disclosure generally relates to radars and more particularly to terrain following radars with smart scanning.

BACKGROUND

Terrain following/terrain avoidance (TF/TA) radars scan a radar beam vertically in front of a platform (e.g., an aircraft) and compare the range and angle of the radar reflections to a pre-computed ideal maneuvering curve. By comparing the distance between the terrain and the ideal curve, the system calculates a maneuver that will make the aircraft clear the terrain by a pre-selected distance. Using TF/TA allows an aircraft to automatically follow terrain at low altitudes and high speeds.

Traditionally, terrain following/terrain avoidance has been accomplished with dedicated radars that are integrated with a platform (e.g., an aircraft flight director) to provide terrain following (TF) guidance. Traditional TF/TA radars are mechanically scanned radars that continuously scan a large volume of space in front of a radar platform to develop navigation guidance for safe low-level flights. Although these approaches have been very safe and effective, the resulting system is heavy, expensive and difficult to maintain. A single forward-looking installation on these radar systems provides good obstacle detection capabilities but has a limited field of regard and places restrictions on platform turn rates. Furthermore, unmanned aerial systems (UAS) and rotary platforms (e.g., helicopters) cannot afford the size, weight, and power (SWAP) cost of installing dedicated radar systems solely for TF/TA.

Since the radar cannot tell what is beyond any immediate terrain, the flight path may also suffer from "ballooning" over sharp terrain ridges, where the altitude becomes unnecessarily high. Furthermore, obstacles such as radio towers may be detected late by the radar and cause collision hazards.

SUMMARY

In some embodiments, the disclosure is directed to a method and system for terrain following/terrain avoidance that utilizes critical terrain points, a quality metric, potential towers, terrain/obstacle databases, and mission data to command the radar scan during TF/TA operations.

In some embodiments, a method for smart scanning by a Terrain Following/Terrain Avoidance (TF/TA) radar includes: receiving terrain information and known obstacle information from a plurality of databases; receiving radar data from the TF/TA radar; fusing the terrain information and known obstacle information with the radar data; adding unknown obstacle information to the fused data to generate scanning schedule information; and utilizing the scanning schedule information to schedule a next radar scan by the TF/TA radar.

In some embodiments, a Terrain Following/Terrain Avoidance (TF/TA) radar includes: a receiver for receiving terrain information and known obstacle information from a plurality of databases, and receiving radar data for the TF/TA radar; a processor for fusing the terrain information and known obstacle information with the radar data and adding unknown obstacle information to the fused data to generate scanning schedule information; and a scan controller for utilizing the scanning schedule information to schedule a next radar scan by the TF/TA radar.

In some embodiments, a Terrain Following/Terrain Avoidance (TF/TA) radar includes: means for receiving terrain information and known obstacle information from a plurality of databases; means for receiving radar data from the TF/TA radar; means for fusing the terrain information and known obstacle information with the radar data; means for adding unknown obstacle information to the fused data to generate scanning schedule information; and means for utilizing the scanning schedule information to schedule a next radar scan by the TF/TA radar.

Optionally, uncertainty information may be added to the scanning schedule information, where the uncertainty information includes uncertainty in data of the plurality of databases. In some embodiments, the unknown obstacle information is calculated as potential towers or hazards with associated uncertainties, as a function of range and elevation. Also optionally, mission information may be added to the scanning schedule information to determine scan of points of interest or avoidance.

BRIEF DESCRIPTION OF THE DRAWINGS

The components in the figures are not necessarily to scale, emphasis instead being placed upon illustrating the principles of the disclosure. Like reference numerals designate corresponding parts throughout the different views. Embodiments are illustrated by way of example and are not limited by the figures of the accompanying drawings, in which.

DETAIL DESCRIPTION

In some embodiments, the present disclosure is directed to a terrain following/terrain avoidance (TF/TA) radar as a part of a multifunction system to include centralized processing, 360° field of regard (FOR) and more robust use of external terrain data. These enhancements translate to increased performance with decreased aperture times, which frees up resources for multimode and multifunction operations. The fusing of external terrain data with active radar data frees up resources, increases terrain height accuracy, and allows for self-contained navigation. External terrain data includes a-priori data sources like Digital Elevation Maps (DEM), Digital Terrain Elevation Data (DTED), Precision 3D (P3D), and/or other obstacle databases and multi-platform information sharing.

In some embodiments, instead of generating scan commands from predefined scan patterns, the TF/TA smart scan radar of the present disclosure is generated based on critical terrain, a quality metric, uncertainty metric and potential towers. Additionally, a-priori terrain and obstacle database data (such as DEM, DTED or P3D) is used for early avoidance of obstacles (e.g., terrain and towers). Mission data is also incorporated into the scan to determine scan of points of interest or areas to avoid. Accordingly, the TF/TA radar scans only critical areas, for example, obstacle points with a large degree of uncertainty that affect safe TF/TA navigation. Upon detection of a hostile radar, the TF/TA radar adjusts its scanning scheduling to minimize the chances of being detected by the hostile radar warning receiver.

This smart scan approach allows an active electronically scanned array (AESA) radar with a terrain and obstacle database to minimize the radar scans required to maintain safe TF flight. For example, the radar only needs to scan to ensure navigational accuracy and alignment with the database while searching for uncharted obstacles. Minimizing the required radar dwells frees up timeline to maximize multifunctional capability.

Figure 1:
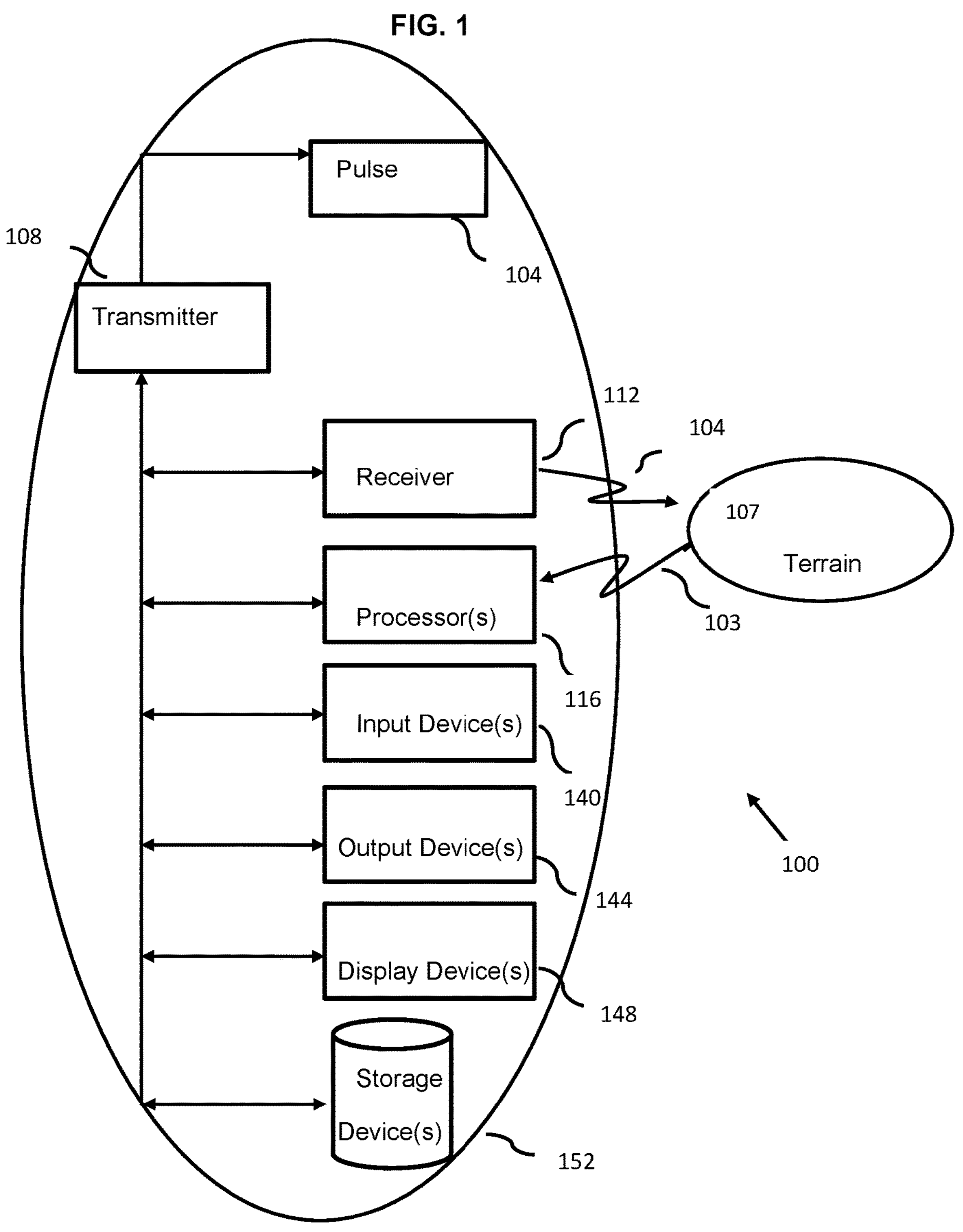
FIG. 1 is a system block diagram of an exemplary TF/TA smart scan radar, according to some embodiments of the disclosure.

FIG. 1 is a system block diagram of an exemplary TF/TA smart scan radar, according to some embodiments of the disclosure. As shown, a TF/TA smart scan radar 100 includes a radar pulse generator 104, a transmitter 108 and receiver 112. The transmitter 108 sends radar transmission pulses 104 towards an area of the terrain 107 for a period of time. Radar return pulses 103 are generated in response to the radar transmission pulses reflecting off the terrain 107. The receiver observes a return signal echoing of the terrain. Receiver 112 also receives terrain information and known obstacle information are received from various databases.

Input devices 140 receive information from a user (not shown) and/or another computing system (not shown). As explained in more detail below, the receive information may include platform states and orientation, flight corridors, maximum and minimum radar scan ranges, known and unknown obstacles along the terrain, and mission data. The input devices 140 can include, for example, Bluetooth interface, WiFi interface, network interface, a keyboard, a scanner, a microphone, a stylus, a touch sensitive pad or display. The output devices 144 output information associated with the system 100 (e.g., information to navigation and flight control devices, information to a pilot, information to a display, and the like. One or more processors 116 execute the smart scan instructions, such as when, where and for how long to perform scanning of certain portion of the terrain. Processors 116 also execute the instructions for the system (e.g., applications).

Storage devices 152 store a variety of information/data, including scanning schedule, radar range data generated by the system 100 and various databases, or some proportion of database information, on a temporary or permanent basis. Display devices 148 display information associated with the system 100, for example, terrain and obstacle information including their position, distance, type and the like, status information, platform configuration information and the like. The storage devices 152 can include, for example, long-term storage, such as a hard drive, a tape storage device, or flash memory; short-term storage, such as a random-access memory, or a graphics memory; and/or any other type of computer readable storage. In some embodiments, the process according to the disclosure is performed by the processor(s) 116, utilizing some or all of the components illustrated in FIG. 1.

This way, the smart scan concept is configured to use a combination of a-priori data and radar data to safely conduct TF/TA operations. Instead of using radar data for all TF guidance in the terrain, the radar is used to verify only critical terrain clearance and to scan for potential unknown obstacles. A-priori data is used to provide TF guidance for all other conditions and provide early platform response against the terrain. The radar scans only those areas required for safe and effective TF/TA. This limits the requirement for active TF/TA utilization, thus maximizing multifunction operations for functions such as ground moving target indication (GMTI), synthetic aperture radar (SAR), and communications or for limiting RF emissions for emission control (EMCON) operations to prevent detection of the platform by external systems.

The a-priori data (e.g., DEM, DTED or P3D information) is used to augment active radar data for TF guidance and aid in weather (WX) penetration. The smart scan TF/TA concept is based on active and passive terrain data, critical points, a quality metric, unknown obstacles, and mission data.

A TF/TA radar uses known Clearance Monitor Line (CML), Zero Command Line (ZCL), and Advanced Low Altitude Techniques (ADLAT). The clearance monitor line is a safety feature, which is also called the Obstacle Warning Line (OWL). This line illustrates the performance limit of the platform and is based on whether a maximum pull-up of the radar platform can clear the obstacle at all, and not based on clearing the obstacle by the set clearance plane (SCP). In other words, this line is the absolute warning line representing the platform's maximum capability to avoid an obstacle. For example, when obstacles (e.g., terrain/tower) violate the clearance monitor line, an obstacle warning is issued which leads to a full pull-up command for the platform. The TF/TA command is generated separate from the CML command. The ZCL is calculated based on the same mathematical principles as the ADLAT algorithm. A ZCL curve indicates a zero command for the current platform state. Negative ZCL curves indicate push-over g-commands, while positive ZCL curves indicate pull-up g-commands. The OW (i.e., CML) curve indicates an obstacle warning if terrain penetrates that line.

ADLAT determines the maximum g-command (flight angle command) needed for the platform to clear obstacles in the relevant terrain. The flight angle command is the slope of the pull-up parabola at predicted aircraft positions. Every point in the command profile is passed through the ADLAT algorithm, which takes the platform's current speed and attitude and calculates an instantaneous flight vector command to pass over each point at the selected SCP. The maximum flight vector command is the final command selected for the TF command.

In some embodiments, the processors 116 of the TF/TA smart scan radar 100 generates radar scan commands based on the following:

1. Critical Points (CP): the scan controller calculates the CP within the command corridor for a fused 3D a-priori and radar data, such as LAM;
2. Quality Metric: the scan controller calculates the measurement uncertainty for the 3D LAM data as a function of range and elevation;
3. Unknown Obstacles: the scan controller calculates potential towers/hazards with the associated uncertainties as a function of range and elevation; and/or
4. Mission Data: the scan controller scans (e.g., navigation registration) or avoids (e.g., radar warning receiver or jammer) certain areas based on mission needs.

As known in the art, "LAM" is a local area map, which is a local manifestation of the fused obstacle database and radar data.

Figure 2:
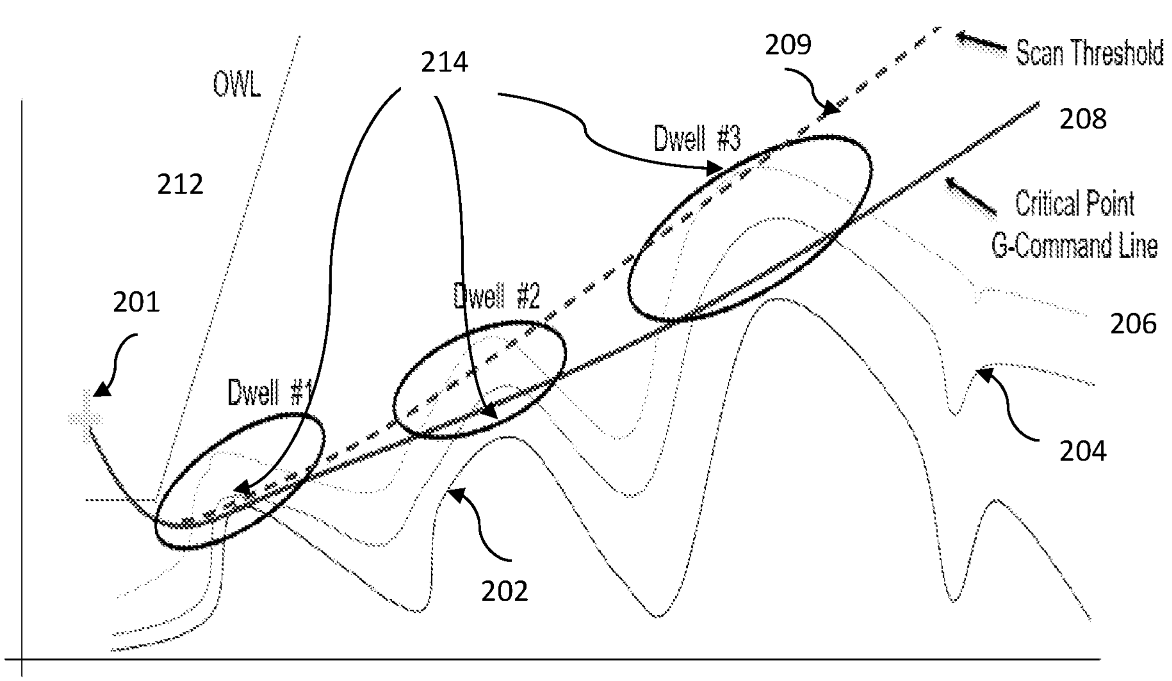
FIG. 2 illustrates a graph illustrating the smart scan approach including dwell times of a TF/TA radar, according to some embodiments of the present disclosure.

FIG. 2 illustrates a graph illustrating the smart scan approach including dwell times of a TF/TA radar 201 in a 2D representation, according to some embodiments of the present disclosure. The vertical axis is the altitude of the radar platform, and the horizontal axis is the range in front of the radar. Critical points 214 on the terrain curve 202 are one of the primary drivers of the scan controller. The terrain curve 202 is constructed (or populated) from radar data and various relevant databases, such as DEM, DTED, P3D, and/or other obstacle databases. In contrast to the traditional TF radars, TF/TA radar 201 does not scan along all the points on the terrain 202, rather it selects every point from the fused data (explained in more detail below) and generates a g-command for each such point to clear the point.

The critical points 214 are the points that generate the largest g-command out of the ADLAT algorithm. To find the critical point, all 3D LAM data (i.e., fused a-priori and radar data) within the command corridor (within the minimum and maximum scan ranges) are run through ADLAT. ADLAT then calculates each critical point (CP) 214 and corresponding CP g-command line 208 (in this case, the CP g-command line 208 corresponds to the first CP 214 associated with the Dwell #1); however, each CP has its own CP g-command line. The line is variable depending on configuration (e.g., platform, load) and state (e.g., velocity). The CP g-command line 208 becomes the decision threshold for scheduling a radar dwell. In other words, g-command line 208 indicates how much correction is needed for the radar platform to safely clear the pitch rate.

The OWL line 212 indicates an obstacle warning if terrain penetrates that line. Some margin (not to exceed the OWL) may be added to this threshold to limit scan requirements, as shown by the dashed line representing scan threshold 209. In some embodiments, the margin between the OWL line 212 and the g-command line 208 indicates the capability of the platform to climb up (e.g., 1.2 G). The radar 201 scans each point above the scan threshold 209 at the required revisit rate. In some embodiments, the scan threshold 209 is associated with any error in the relevant databases and where the unknow obstacles are believed to be. In some embodiments, the unknow obstacles information is based on the data and uncertainties contained within the associated a-priori database (e.g., some databases don't contain towers, or others have several meters of error inherent to the data).

As known in the art, the Advanced Low Altitude Radar Model, or ALARM, is a generic digital computer simulation designed to evaluate the performance of a ground-based radar system attempting to detect low-altitude aircraft. The purpose of ALARM is to provide a radar analyst with a software simulation tool to evaluate the detection performance of a ground-based radar system against the target of interest in a realistic environment.

In some embodiments, a quality metric (i.e., measurement uncertainty) 204 is added to the CP logic to account for any uncertainty in the databases. Each piece of data (either radar data or a-priori data) has an elevation uncertainty associated with it. This uncertainty measure (curve) 204 is factored in for the radar scan scheduling. The data uncertainty line 204 is added to all the LAM data within the flight corridors (i.e., command, TC, and TAA). An unknown area still needing refinement is augmented with some standard deviations of uncertainty (e.g., 1-sigma, 2-sigma, etc.).

Unknown obstacles in the flight corridor are another source of calibration for the scanning schedule. The radar searches for unknown obstacles (e.g., towers/hazards) not contained in the a-priori database. The unknown obstacle search is therefore dependent on the a-priori database. An unknown obstacles metric curve 206 is added to the uncertainty curve 204 and the CP 3D LAM data. These obstacles include towers or hazards identified by machine learning (ML/AI) approaches, based on surrounding terrain. In some embodiments, the ML/AI classifies some of the obstacles by their types, so that the platform can avoid them. For example, the ML/AI might classify wires as a potential hazard between two detected telephone poles.

The towers are based on detection requirements of potential tower heights versus range. For DTED data without towers, higher towers need detection earlier due to the required aircraft response time. The unknown obstacle search is therefore database and range dependent. The ML/AI-identified obstacles are based on surrounding terrain (e.g., guidewire between poles). The unknown obstacles logic (curve 206) is added to the uncertainty (curve 204) and CP logic (curve 202). As shown, the scan threshold 209 is connected to all the uncertainties for the unknown obstacles logic (curve 206).

Mission data is another of the primary drivers of the scan controller. Mission data is provided from intelligence, mission planning, operator input, or other onboard sensors. The scan controller (e.g., processors 116 in FIG. 1, or 322 in FIG. 3) schedules a scan or avoids certain areas based on mission needs. For example, the radar might scan a certain tie-point to assist navigation registration (INS refinement). As another example, the radar might avoid a radar warning receiver (RWR) or jammer based on mission planning and intelligence.

Finally, the scan controller schedules the radar dwell (i.e., pointing angle and time) based on (one or more of) the unknown obstacles metric curve 206, the uncertainty curve 204, the CP 3D LAM data and the mission data. In some embodiments, the dwell is based on the 3D data (LAM+Quality Metric+Unknown Obstacles+Mission Data) within the scan range. As shown, the TF/TA radar 201 scans each point above the scan threshold 209 at the required revisit rate. That is, the scan controller (processor) of radar 201 schedules a dwell (pointing angle & time) for the points that exceed the scan threshold. The scan controller scans each point above the scan threshold 209 at the required revisit rate. For points not yet scanned, OW, Turn Caution (TC), Turn Alert Advisory (TAA), and Command Corridor decisions are made based on LAM data with uncertainties, unknown towers, and mission data.

In some embodiments, during initialization (prior to scanning all required points), the TF algorithms make OW, TC, TAA, and command corridor decisions based on LAM data with uncertainties, unknown towers, and mission data prior to incorporating the active radar measurements.

Figure 3:
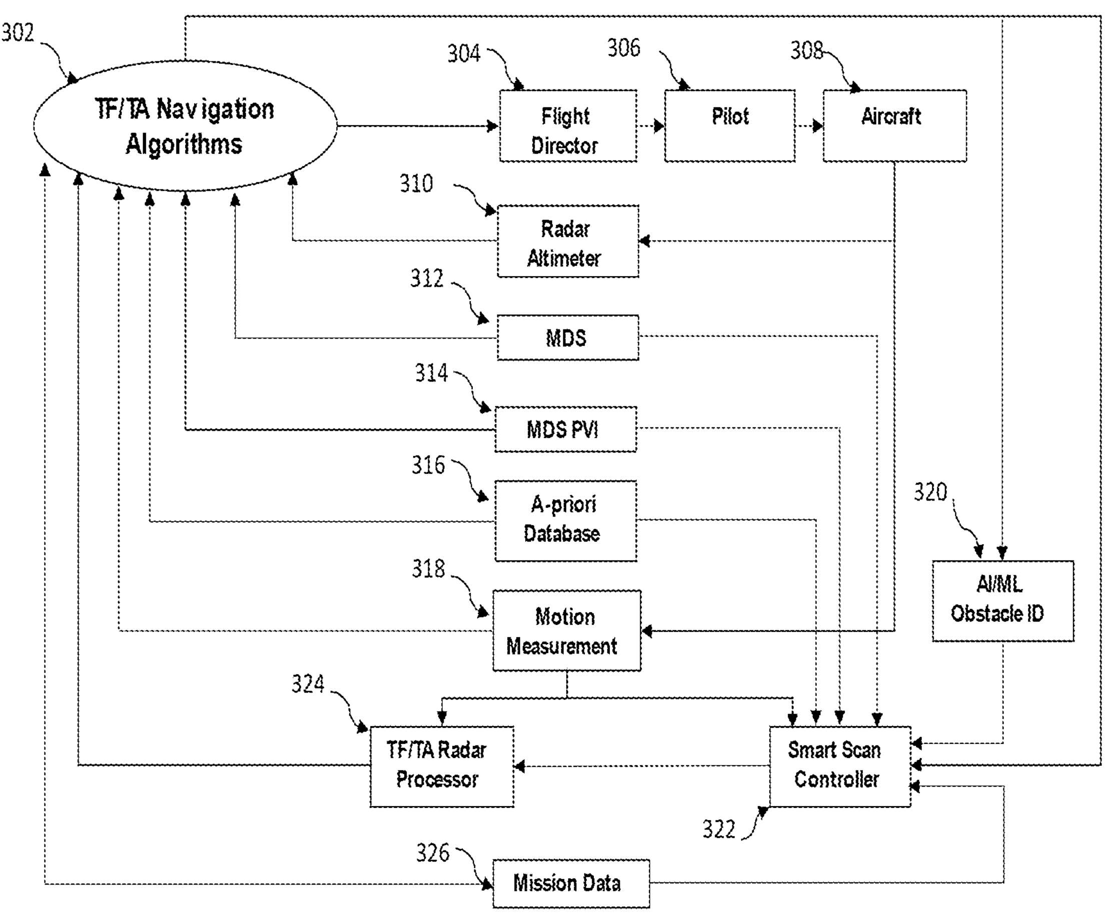
FIG. 3 shows a block diagram of a smart scan TF/TA radar, according to some embodiments of the present disclosure.

FIG. 3 shows a block diagram of a smart scan TF/TA radar, according to some embodiments of the present disclosure. TF/TA navigation algorithms 302 calculate the optimal route over terrain and obstacles. TF/TA navigation algorithm outputs include obstacle information, g-commands, warnings cautions and advisories (WCA), and display information. A flight director 304 takes these outputs and displays it to the Pilot 306 who in turn controls the Aircraft 308. A radar altimeter 310 calculates Aircraft height above the ground and outputs this data to the TF/TA navigation algorithms 302. Mission Data Series (MDS) 312 contains platform specific capabilities (e.g., climb, speed, turn rate) and configuration information. MDS Pilot Vehicle Interface (PVI) 314 is pilot selected settings such as set clearance plane (SCP), ride settings, and display range scales. A-priori database 316 includes information about the terrain and obstacle database data along with measurement uncertainties. Motion measurement circuit 318 calculates the inertial navigation solution (INS) data with uncertainties. Mission data 326 is data identified via mission planning and includes threats and planned flight routes. An AI/ML Obstacle Identification (ID) 320 analyzes the terrain/obstacle data for potential unknown obstacles. A smart scan controller 322 determines the scan commands, which include beam pointing angle and radar dwell times. A TF/TA radar processor 324 executes the radar scan and performs the signal processing and detection processing.

The inputs to the TF/TA navigation algorithms 302 come from the radar altimeter, MDS, MDS PVI, A-priori database, motion measurements, TF/TA radar processor, and mission data. The outputs of the TF/TA navigation algorithms are inputs to the flight director 304, AI/ML Obstacle ID 320, and the smart scan controller 322. The inputs to the smart scan controller 322 include the platform state information (motion measurements), corridors and terrain/obstacle profile data with uncertainties (TF/TA navigation algorithms), maximum and minimum scan ranges (MDS), user settings (MDS PVI), unknown obstacles (A-priori database and AI/ML Obstacle ID), and mission data.

The output of the smart scan controller 322 (e.g., scan commands, such as pointing angle, dwell time) is an input to the TF/TA Radar Processor 324. The TF/TA radar processor also receives inputs from motion measurements (e.g., INS data), and outputs radar detections. Based on its inputs, the TF/TA radar processor 324 executes the smart scan instructions, such as when, where and for how long to perform scanning of certain portion of the terrain. The smart scan instructions may include all or some of direction, range, height, angle, azimuth angle and the like.

In some embodiments, the inputs to the smart scan radar are platform state, flight corridors (e.g., command, TC, TAA), profile data (e.g., e.g., command corridor, TC, and TAA), maximum and minimum scan ranges, LAM data with quality, unknown obstacles (requirement, database, AI/ML), and mission data (e.g., navigation points of interest or threats. The processor (e.g., a scan controller) calculates CP g-command from profile data, extracts LAM elevation data (within corridors), overlays uncertainties on the LAM elevation data, overlays unknown obstacles on the data, calculate points generating a greater g-command than the CP based on ADLAT approach, adds and removes points based on mission data (e.g., registration, RWR, etc.), and then schedules beam positions (pointing angles) and dwell times of the radar.

Figure 4:
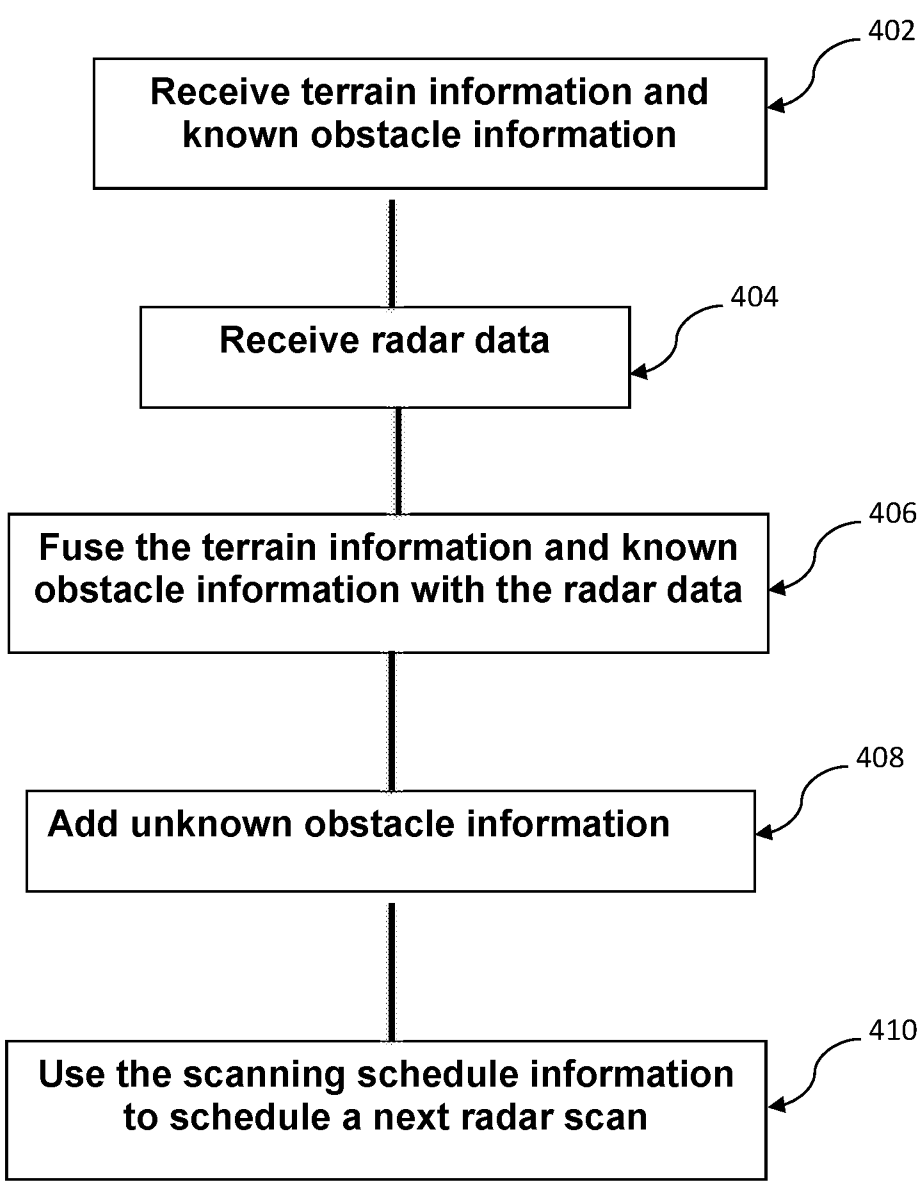
FIG. 4 is a process flow diagram of a smart scan TF/TA process, according to some embodiments of the present disclosure.

FIG. 4 is a process flow diagram of a smart scan TF/TA process, according to some embodiments of the present disclosure. As shown in block 402, terrain information and known obstacle information are received from various databases. In some embodiments, the information is received from a-priori terrain and obstacle databases, such as DEM, DTED or P3D and is utilized for detection of obstacles (e.g., terrain and towers). In block 404, radar data received, for example from LAM, which is a local area map, which is a local manifestation of the fused obstacle database and radar data. As described above, instead of using radar data for all TF guidance in the terrain, the TF/TA radar verifies only critical terrain clearance and to scan for potential unknown obstacles. As explained with respect to FIG. 2, terrain curve 202 is constructed (or populated) from radar data and various relevant databases, such as DEM, DTED, P3D, and/or other obstacle databases.

In block 406, the terrain information and known obstacle information are fused with radar data to provide necessary information for the radar scanning. Unknown obstacle information is then added to this fused information to obtain some level of prediction for potential unknown obstacle in the terrain. The unknown obstacle information is then added to the fused data to generate scanning schedule information, in block 408. Scanning schedule information may include all or some of direction, range, height, angle, azimuth angle, where to scan and the like. The radar searches for unknown obstacles (e.g., towers/hazards) not contained in the a-priori database. In some embodiments, a scan controller calculates potential towers/hazards with the associated uncertainties as a function of range and elevation.

Optionally, uncertainty information, such as uncertainty in data of the plurality of databases, and/or mission information may also be added to the scanning schedule information. In block 410, the radar utilizes scanning schedule information to schedule a next radar scan. For example, the TF/TA radar executes the smart scan instructions to determine when, where and for how long to perform scanning of certain portion of the terrain.

It will be recognized by those skilled in the art that various modifications may be made to the illustrated and other embodiments of the disclosure described above, without departing from the broad scope thereof. It will be understood therefore that the disclosure is not limited to the particular embodiments or arrangements, but is rather intended to cover any changes, adaptations or modifications which are within the scope and spirit of the disclosure as defined by the appended claims and drawings.

The invention claimed is:

1. A method for smart scanning by a Terrain Following/Terrain Avoidance (TF/TA) radar, the method comprising:
- receiving terrain information and known obstacle information from a plurality of databases;
- receiving radar data from the TF/TA radar;
- fusing the terrain information and known obstacle information with the radar data to generate fused data;
- adding unknown obstacle information with associated uncertainty information determined as a function of range and elevation to the fused data to generate scanning points information;
- utilizing the scanning points information to select each point from the fused data with unknown obstacle information to schedule a next radar scan by the TF/TA radar with a scan threshold for the uncertainty information; and
- based on the next radar scan by the TF/TA radar, generating a command to clear each point from the fused data with unknown obstacle information.

2. The method of claim 1, further comprising scheduling scanning of each point from the fused data with unknown obstacle information with a required revisit rate.

3. The method of claim 1, wherein the associated uncertainty information includes uncertainty in data of the plurality of databases.

4. The method of claim 1, further comprising calculating the unknown obstacle information as potential towers or hazards with the associated uncertainty information determined as the function of range and elevation.

5. The method of claim 1, wherein the radar data includes range and elevation of the TF/TA radar.

6. The method of claim 1, further comprising adding mission information to the scanning points information to determine scanning of points of interest.

7. The method of claim 6, further comprising avoiding scanning of certain areas based on the mission information.

8. The method of claim 1, wherein the TF/TA radar is located on a platform, the method further comprising calculating critical points along a terrain from the fused data with unknown obstacle information to generate a maximum flight angle for the platform to clear obstacles in the terrain.

9. A Terrain Following/Terrain Avoidance (TF/TA) radar comprising:

a receiver configured to receive terrain information and known obstacle information from a plurality of databases and to receive radar data for the TF/TA radar;

a processor configured to:

fuse the terrain information and known obstacle information with the radar data to generate fused data; and add unknown obstacle information with associated uncertainty information determined as a function of range and elevation to the fused data to generate scanning schedule points information; and a scan controller configured to utilize the scanning points information to select each point from the fused data with unknown obstacle information to schedule a next radar scan by the TF/TA radar with a scan threshold for the uncertainty information;

wherein the processor is further configured to generate, based on the next radar scan, a command to clear each point from the fused data with unknown obstacle information.

10. The TF/TA radar of claim 9, wherein the processor is configured to schedule scanning of each point from the fused data with unknown obstacle information with a required revisit rate.

11. The TF/TA radar of claim 2, wherein the associated uncertainty information includes uncertainty in data of the plurality of databases.

12. The TF/TA radar of claim 9, wherein the processor is configured to calculate the unknown obstacle information as potential towers or hazards with the associated uncertainty information determined as the function of range and elevation.

13. The TF/TA radar of claim 9, wherein the radar data includes range and elevation of the TF/TA radar.

14. The TF/TA radar of claim 9, wherein the processor is configured to add mission information to the scanning points information to determine scanning of points of interest.

15. The TF/TA radar of claim 14, wherein the scan controller is configured to avoid scanning of certain areas based on the mission information.

16. The TF/TA radar of claim 9, wherein the TF/TA radar is located on a platform, the processor further configured to calculate critical points along a terrain from the fused data with unknown obstacle information to generate a maximum flight angle for the platform to clear obstacles in the terrain.

17. A Terrain Following/Terrain Avoidance (TF/TA) radar comprising:

means for receiving terrain information and known obstacle information from a plurality of databases;

means for receiving radar data from the TF/TA radar;

means for fusing the terrain information and known obstacle information with the radar data to generate fused data;

means for adding unknown obstacle information with associated uncertainty information determined as a function of range and elevation to the fused data to generate scanning points information;

means for utilizing the scanning points information to select each point from the fused data with unknown obstacle information to schedule a next radar scan by the TF/TA radar with a scan threshold for the uncertainty information; and means for generating, based on the next radar scan by the TF/TA radar, a command to clear each point from the fused data with unknown obstacle information.

18. The TF/TA radar of claim 17, further comprising means for scheduling scanning of each point from the fused data with unknown obstacle information with a required revisit rate.

19. The TF/TA radar of claim 17, further comprising means for calculating the unknown obstacle information as potential towers or hazards with the associated uncertainty information determined as the function of range and elevation.

20. The TF/TA radar of claim 17, further comprising means for adding mission information to the scanning points information to determine scanning of points of interest.

* * * * *